Patented July 4, 1944

2,352,691

UNITED STATES PATENT OFFICE 2,352,691

ANESTHETIC COMPOUND AND PREPARATION

David Curtis, New York, N. Y.

No Drawing. Application July 25, 1941,
Serial No. 404,047

4 Claims. (Cl. 260—472)

The present invention relates to acetyl salicylic acid salts of anesthetic bases, and more particularly to acetyl salicylic acid salts of the alkamine esters of amino benzoic acids and more particularly of the alkamine esters of para-amino benzoic acids, such as diethylaminoethanol-para-amino-benzoate and gamma dinormal - butyl - amino - propanol - para-aminobenzoate, and the like. This application is a continuation in part of my application Serial No. 171,992, filed October 20, 1937, which was issued on the 24th day of March, 1942, as U. S. Letters Patent No. 2,277,038.

It is the object of the present invention to provide a new group of anesthetic substances highly suitable and potent for local and surface anesthetic uses.

It is another object of the present invention to provide water soluble anesthetic substances which combine with their anesthetic properties the additional therapeutic effects of aspirin, and which are particularly useful now with the increased employment of local anesthetics, such as procaine hydrochloride, in conditions other than as a local anesthetic for operative procedure, such as when injection is made in injured limbs, for the purpose of setting and permitting the patient to perform exercises of the limb while under the influence of the local anesthetics, and similar such purposes.

It is a further object of the present invention to provide new and simplified methods for preparing the anesthetic salts of the present invention as well as of anesthetic salts of acetyl salicylic acid, in general.

It is a still further object of the present invention to provide methods for obtaining solutions in water of anesthetic bases and salts which are generally insoluble in water and provide new and potent surface and local anesthetic preparations resulting from the practice of such methods.

The anesthetic salts of the present invention include diethyl - amino - ethanol - para-aminobenzoate acetyl salicylate or procaine acetyl salicylate or "Proco-Pirin," which is a clear, transparent, highly viscous mass, easily becoming fluid on a water bath. A 5% solution of the substance in water gives a pH value of 4.8–5.0, brom cresol green as indicator. When to 250 cc. of the 5% solution 2.2518 gms. of glycine (amino acetic acid), are added, the pH remains unchanged.

Also included is gamma di-normal-butyl-amino - propanol - para amino-benzoate-acetylsalicylate or butyn-acetyl salicylate, which is also a clear viscous substance.

Procaine acetyl salicylate or Proco-Pirin is extremely soluble in water.

The salts of the present invention, as well as other salts of anesthetic esters of amino-benzoic acid with aspirin, such as benzocaine acetyl salicylate, butesin acetyl salicylate, and the like, may be prepared by any one of several methods.

Thus, the above acetyl salicylates may be prepared by the direct union of substantially equimolecular proportions of the constituent base and acid in any suitable dispersing vehicle, or solvent, such as water or a volatile vehicle, such as acetone, alcohol or the like, with or without heating, depending on the nature of the dispersion medium, or solvent. The condensation product, or salt may then be separated out by evaporation of the medium or by filtration, as the case may be.

Butyn base, precipitated from 0.7106 gm. of butyn sulphate (with ammonium hydroxide and extracted with chloroform) may be dissolved in 20 cc. of acetone and an equimolecular amount (0.360 gm.) of aspirin added to the solution. The acetone is then driven off on the water bath. A clear viscous mass results. This mass may be taken up with 30 cc. of water and another portion of 0.360 gm. of aspirin and 10 cc. of acetone added. The material then goes into solution which registers a pH of 4.3–4.4 (brom cresol green).

By the above method, both water soluble and water insoluble anesthetic salts of aspirin may be prepared in an aqueous medium. For example, 8.25 gms. of benzocaine and 9.00 gms. of aspirin are mixed and dispersed in 150 cc. of water and heated, to a temperature below the melting point of the finished product (approximately 140°) and constantly stirring during the heating. The heating and stirring are continued until the reactants agglomerate and a substance of uniform and granular appearance is formed. The heating may be carried out to incipient fusion of the mass. Cold water is then immediately added and granulation takes place again. The substance is filtered off and may then be dried or added to a solvent in which it is intended to be used. The substance is soluble in water to an extent less than 1.5%.

When the salts prepared in an aqueous medium are soluble in it, as is the case with Proco-Pirin, they may be allowed to remain in solution which may be diluted to the proper concentration and otherwise adjusted with certain indicated additive substances to be ready for direct use.

The salts of the invention as well as the salts of other esters of amino benzoic acid with aspirin may also be prepared by the direct union of the ingredients, without the employment of a solvent or dispersing medium, by merely warming a mixture of substantially equimolecular proportions of the constituent base and acid, while stirring, in a suitable vessel on the water bath.

Thus 7.08 gms. of procaine base and 5.4 gms. of aspirin may be placed in a vessel on a water bath and the mixture heated and stirred until complete liquefaction and fusion take place, and the reaction is completed.

Likewise, 16.5 gms. of benzocaine base and 18.0 gms. of aspirin may be placed in a vessel on a water bath and stirred and heated until complete liquefaction and fusion take place and the reaction is completed.

Butesin, propoesin and benzocaine acetyl salicylates may be prepared in the same manner.

If desired, the two above methods may be combined and the ingredients first dispersed or dissolved in a liquid medium from which they are then separated and the resulting mass liquefied and fused on the water bath. Or, the ingredients are first fused and then dissolved in a liquid medium from which the formed salts then may be separated out. Concentration and cooling may be used for separation.

I have also found that the salts of the present invention, as well as the acetyl salicylates of other esters of amino benzoic acid may be prepared not only by direct union of the active ingredients, but also by neutralizing the acid linkage of a soluble salt of the anesthetic with some alkaline substance and combining the liberated base with the acetyl salicylic acid.

Thus, Proco-Pirin may be prepared from the easily obtainable and commercially more prevalent procaine hydrochloride. For example: 8.178 gms. of procaine hydrochloride may be dissolved in 5 cc. of water. 30 cc. of N/1 NaOH or the equivalent of $Na_2CO_3$ are added. 5.40 gms. of aspirin are then stirred in and the mixture warmed until the precipitated procaine base combines with the aspirin. The above solution, when diluted to a 2% solution with respect to procaine base content shows a pH of 4.8–5.0 (brom cresol green).

Likewise 0.7106 gm. of butyn sulphate may be dissolved in 10 cc. of water and 0.106 gm. of $Na_2CO_3$, separately dissolved in 10 cc. of water, added and the mixture stirred until butyn base is precipitated. 0.36 gm. of aspirin are then stirred in the mixture warmed on the water bath. An excess of aspirin must be added to complete the solution, which then clears. The butyn base may again be precipitated from this solution by adding ammonia water.

The salts of the present invention are suitable for use as local and surface anesthetics, taken by themselves or in combination with other anesthetic bases or salts and the customary additive substances, vaso-constrictors and preservatives.

This is particularly true of Proco-Pirin the aqueous solution of which, I find, to be an excellent solvent for anesthetic bases and salts which are generally insoluble in water.

Thus, while a solution of 8.178 gms. of procaine hydrochloride (equivalent to 7.08 gms. of procaine base) in 10 cc. of water may have one gram of benzocaine base stirred into it and dissolved by warming, the benzocaine base stirred into it and dissolved by warming, the benzocaine base will precipitate soon on cooling. However, the same amount of benzocaine base and even 2 or 3 gms. of it may be dissolved by warming in a solution of 12.48 gms. of Proco-Pirin (equivalent to 7.08 gms. of procaine base) in 10 cc. of water, and a solution of much greater stability is obtained.

Applicant believes that the dissolution of an insoluble local anesthetic, such as benzocaine, butesin or procaine base in a concentrated aqueous solution of a water soluble salt of procaine is probably accounted for by the theory of "like dissolves like," namely, an ester dissolving an ester. In the present instance, the greater efficiency of procaine acetyl salicylate as a solvent is probably accounted for by the fact that the acetyl salicylic acid is an ester of salicylic acid and of acetic anhydride. We thus have in procaine acetyl salicylate a combination of a chemical nature of an ester base with an ester acid which acts as a superior solvent vehicle in water for a water insoluble ester.

To retain the water insoluble benzocaine for even longer periods in solution in Proco-Pirin, glycerine or alpha ethyl glycerin ether may be added to the solution, or glycol, diethylene glycol or their ethers, and in particular mono-ethyl ether of diethylene glycol, propylene glycol or its ethers may also be added to an aqueous solution of benzocaine or butesin in Proco-Pirin, for greater stability.

Benzocaine acetyl salicylate (Aspircaine) may also be incorporated into an aqueous solution of Proco-Pirin. Thus 10.8 gms. of aspirin may be combined with its equivalent of 14.160 gms. of procaine base in 20 cc. of water and as much as 8 gms. of benzocaine acetyl salicylate may then be stirred in. A powerful anesthetic is obtained thereby, which is substantially stable.

Likewise, 4 gms. of benzocaine acetyl salicylate may be dissolved in a solution 14.48 gms. of Proco-Pirin dissolved in 10 cc. of water forming a ready solution.

Suitable surface anesthetic preparations may be prepared with "Proco-Pirin" in combination with alkyl esters of amino benzoic acid and their salts, either in water or in glycerine, which normally contains some water. Thus, desirous aqueous surface anesthetic preparations may be prepared which contain from about 25% to about 50%, wt./vol. of procaine acetyl salicylate and from 4% to 8%, or even more of benzocaine base, or as high as 16% of benzocane acetyl salicylate. Similarly, glycerine solutions containing from 20% by wt./vol. of procaine acetyl salicylate and from 4% to 8% by wt./vol. of benzocaine base may be made, to constitute highly desirable surface anesthetics.

The easily-soluble-in water Proco-Pirin, as well as its concentrated solution with an insoluble surface anesthetic may be used with vaso-constrictors and anti-oxidants, in the usual manner. It may be used with epinephrine and its various salts, such as the hydrochloride, the bitartrate, the acetate, the citrate, as well as epinephrine acetyl salicylate, epinephrine gluconate, epinephrine galactonate, epinephrine gulonate or epinephrine cinnamate. Epinephrine substitutes may also be used, such as ephedrine, ephedrine salts, ephetonin, tyramin and their salts, and also 1-meta-hydroxyphenyl-methyl-amino ethanol, its hydrochloride, gluconate, gulonate and its other salts.

As anti-oxidants, for the prevention of the oxidation of the vaso-constrictors as well as the anesthetic substances, the following may be used: sodium sulphite, sodium bisulphite or sodium thiosulphate together with either of the first two mentioned. I may also use with the sodium thiosulphate acetone sodium bisulphite or benzaldehyde sodium bisulphite. The last two substances may also be used as anti-oxidants by themselves.

Thus a local anesthetic solution of Proco-Pirin may be made up to contain 2% of procaine acetyl salicylate, 0.66% of NaCl, 0.5% of chlorbutanal, 0.11% anhydrous sodium thiosulphate, 0.067%–

0.1% of sodium bisulphite or 0.04% of benzaldehyde sodium bisulphite and 1:30,000 or 1:60,000 of some epinephrine salt, mentioned above, figured to base content.

It may here be stated that the various epinephrine salts above mentioned may be prepared in an aqueous medium by dissolving one equivalent of epinephrine base with at least two equivalents of the particular acid with which the base is to combine.

Solutions of the various epinephrine salts may also be prepared by adding to a certain amount of epinephrine hydrochloride or bitartrate or the like, in water, an equivalent amount of sodium carbonate or the like, to neutralize the acid radicle, and then adding the appropriate amount of the new acid, to form the new desired salt.

Other substances may be added to solutions, aqueous or other, of the anesthetic salts of acetyl salicylic acid. The addition of glycine to Proco-Pirin, has already been mentioned. Glycine may also be added to a solution of benzocaine acetylsalicylate in glycerine. Thus, to 20 gms. of benzocaine acetyl salicylate dissolved in 100 cc. of glycerine, are added 25 cc. of alpha-mono-ethyl glyceryl ether. Separately 3 gms. of glycine are dissolved in 15 cc. of water and the two solutions are brought together. 25 cc. of mono-ethyl ether of diethylene glycol may also be added for greater stability, in solution.

Highly desirable anesthetic preparations of Proco-Pirin and of other anesthetic acetyl salicylates, such as benzocaine acetyl salicylate, propoesin acetyl salicylate and butesin acetyl salicylate may be prepared with the addition of picric acid.

An example of such a preparation consists of 5.04 gms. of aspirin combined in 10 cc. of water with 7.08 gms. of procaine base to form Proco-Pirin, into the solution of which 3.437 gms. of picric acid are stirred in. (This represents 1 equivalent of picric acid to 2 equivalents of the procaine base content.) When to the yellow precipitate formed 50 cc. of water are added, it becomes more finely granulated.

Such picric acid preparations may also be prepared by dissolving in a volatile vehicle, such as acetone, for instance, Proco-Pirin, or benzocaine acetyl salicylate, or butesin acetyl salicylate or other anesthetic acetyl salicylate, and adding picric acid in the proportion of one or two molecular equivalents of base to one of picric acid, and evaporating the volatile vehicle.

As an example, 7.4658 gms. of butesin acetyl salicylate are dissolved in 50 cc. of acetone and 2.2911 gms. of picric acid added. The solution is evaporated to dryness leaving a yellow mass.

Another example comprises 5.175 gms. of benzocaine acetyl salicylate dissolved in 50 cc. of acetone and 1.718 gms. of picric acid stirred in and the whole evaporated to dryness leaving a yellow mass.

The picric acid compounds thus obtained are practically insoluble in water and may be incorporated in lanolin or other suitable vehicle for ointments and the like.

The concentrated solutions of Proco-Pirin containing insoluble anesthetics such as benzocaine, butesin, orthoform, or their salts or the like may be diluted with glycerine, glycol, diethylene, glycol, propylene glycol, mono-ethyl-ether of diethylene glycol, alpha-mono-ethyl ether of glycerine, and the like, and then additionally diluted with a volatile solvent, such as alcohol acetone, or the like, to a suitable concentration. Such a solution may be advantageously used to saturate gauze bandages or other suitable fabrics. The volatile solvent is then evaporated, the bandages retaining the active ingredients.

The glycerine or aqueous solution of Proco-Pirin with benzocaine or other insoluble anesthetic substances, as well as the glycerine solutions of the insoluble anesthetic acetyl salicylates, by themselves, may be diluted with a suitable volatile vehicle and be used as a spray for relieving external irritation, where indicated. Suitable volatile vehicles for such purposes include alcohol, acetone, and ethyl chloride may also be used as a volatile vehicle for the direct dissolution therein of benzocaine acetyl salicylate to form a spray.

In view of the ready condensation of the anesthetic bases with aspirin, it is obviously possible to compound a mixture of the reactant ingredients, in powder form, which will be suitable for rendering into a desired liquid, and, with the aid of heat, or without, as the case may be, to form the condensation product in such liquid. Such powders may be compounded together with certain suitable additive ingredients, such as any of the vaso-constrictors and anti-oxidants hereinabove outlined and salt. When it is desired to stamp the compounded powder mixtures into tablets, mannitol or dextrin or other binding material, in suitable proportions may be added.

A typical powder mixture suitable may comprise 54 gms. of aspirin, 70.8 gms. of procaine base, 0.350 gm. of epinephrine bitartrate, 41.21 gms. of sodium chloride, 6.86 gms. of $Na_2S_2O_3$ (anhydrous), and 4 gms. of $NaHSO_3$. This mixture when dissolved in 6240 cc. of water would make up a conventionally used 2% solution of the active anesthetic substance, Proco-Pirin, in this case, with the other ingredients being present in standard proportions.

If it is desired to stamp out the above powders into tablets, 25 gms. of mannitol may be mixed into the mass.

This completes the description of the methods and products of the present invention. It may here be stated, however, while the alkamine anesthetic esters referred to herein are of the group wherein the esterifying alkamine alcohol is of the tertiary type, it is to be understood, that the invention also applies to anesthetic compounds wherein the esterifying alkamine alcohol of the amino benzoic acid may also be of the secondary type. And it is also to be understood, that the present invention applies also to alkamine esters of amino benzoic acid other than of the para-amino type.

What I claim is:

1. As a new compound, the acetyl salicylic acid salt of an alkamine ester of amino benzoic acid.
2. As a new compound, the acetyl salicylic acid salt of an alkamine ester of para-amino-benzoic acid.
3. The product of the chemical union of di-ethyl-amino-ethanol para-amino-benzoate with acetyl salicylic acid.
4. The product of the chemical union of gamma-di-n-butyl amino-propanol-para-amino-benzoate with acetyl salicylic acid.

DAVID CURTIS.